(12) United States Patent
Harrand (10) Patent No.: US 8,510,478 B2
(45) Date of Patent: Aug. 13, 2013

(54) CIRCUIT COMPRISING A MICROPROGRAMMED MACHINE FOR PROCESSING THE INPUTS OR THE OUTPUTS OF A PROCESSOR SO AS TO ENABLE THEM TO ENTER OR LEAVE THE CIRCUIT ACCORDING TO ANY COMMUNICATION PROTOCOL

(75) Inventor: Michel Harrand, Saint-Egreve (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 244 days.

(21) Appl. No.: 12/745,025

(22) PCT Filed: Nov. 5, 2008

(86) PCT No.: PCT/EP2008/065019
§ 371 (c)(1),
(2), (4) Date: Nov. 24, 2010

(87) PCT Pub. No.: WO2009/068419
PCT Pub. Date: Jun. 4, 2009

(65) Prior Publication Data
US 2011/0060893 A1 Mar. 10, 2011

(30) Foreign Application Priority Data
Nov. 27, 2007 (FR) ...................................... 07 08292

(51) Int. Cl.
*G06F 3/00* (2006.01)
(52) U.S. Cl.
USPC .................................. 710/7; 710/20

(58) Field of Classification Search
USPC ........................................................ 710/7, 20
See application file for complete search history.

(56) References Cited

U.S. PATENT DOCUMENTS

| 4,649,516 | A | * | 3/1987 | Chung et al. | ............. 365/230.05 |
|---|---|---|---|---|---|
| 5,113,369 | A | * | 5/1992 | Kinoshita | ..................... 710/307 |
| 5,345,570 | A | * | 9/1994 | Azekawa | ...................... 712/248 |
| 6,021,505 | A | * | 2/2000 | Ayyagari et al. | .............. 713/502 |
| 6,299,069 | B1 | * | 10/2001 | Shona | ........................... 235/492 |
| 6,484,222 | B1 | * | 11/2002 | Olson et al. | ................... 710/300 |
| 6,496,888 | B1 | * | 12/2002 | Pole, II | ......................... 710/110 |
| 7,042,893 | B1 | * | 5/2006 | Lo et al. | ........................ 370/419 |
| 2003/0065863 | A1 | | 4/2003 | Wyland | |
| 2004/0123041 | A1 | * | 6/2004 | Krishnaiyer et al. | ......... 711/137 |
| 2005/0254519 | A1 | * | 11/2005 | Beukema et al. | ............. 370/468 |

OTHER PUBLICATIONS

Freescale Semiconductor Inc.: "MPC860 PowerQUICC Technical Summary" [Online] Nov. 2001, pp. 1-9, XP002486597.
Preliminary International Search Report and Written Opinion dated Jun. 29, 2010, issued in counterpart International Application No. PCT/EP2008/065019.

* cited by examiner

*Primary Examiner* — Farley Abad
(74) *Attorney, Agent, or Firm* — Stroock & Stroock & Lavan LLP (57) ABSTRACT

A circuit having at least one processor and a microprogrammed machine for processing the data which enters or leaves the processor in order to input or output the data into/from the circuit in compliance with a communication protocol.

23 Claims, 8 Drawing Sheets

CIRCUIT COMPRISING A MICROPROGRAMMED MACHINE FOR PROCESSING THE INPUTS OR THE OUTPUTS OF A PROCESSOR SO AS TO ENABLE THEM TO ENTER OR LEAVE THE CIRCUIT ACCORDING TO ANY COMMUNICATION PROTOCOL

CROSS REFERENCE TO RELATED APPLICATIONS

This application is the U.S. National Phase application under 35 U.S.C. §371 of International Application No. PCT/EP2008/065019, filed Nov. 5, 2008, and claims the benefit of French Patent Application No. 0708292, filed Nov. 27, 2007, all of which are incorporated by reference herein. The International Application was published on Jun. 4, 2009 as WO 2009/068419.

FIELD OF THE INVENTION

The present invention relates to a circuit having at least one processor. The circuit has a microprogrammed machine for processing the data which enter or leave the processor in order to input or output the data into/from the circuit in compliance with a communication protocol. It can be used in all fields using microprocessors or multiprocessor circuits.

BACKGROUND

Professional fields such as video surveillance, but also consumer fields such as that of cell phones, employ integrated circuits having one or more microprocessors. Often, these circuits are aimed at applications which, although very specific, are able to make use of numerous input/output interfaces.

On the one hand, these circuits often have to send and receive data in various formats which are not the one for the processor or processors. If each processor manages its own inputs/outputs, that takes all of its computation power. There is no longer any time for it to perform its application software processing. In fact, as it involves controlling the logic state of the outputs in each clock cycle, a processor does not even have the computation power necessary to manage its inputs/outputs. It therefore appears desirable for the circuit to have dedicated peripherals for managing the inputs and the outputs so as to free the processors.

On the other hand, however, these circuits, when in general use and not dedicated to an application defined during their design stage, will no doubt be required, in the course of their use, to send and receive data according to input/output protocols which are not yet known at the time of manufacture of the circuit! In this case, the provision of peripherals for managing the inputs/outputs is a problem.

A current solution implemented on general-use microprocessor or multiprocessor circuits involves implementing a large number of dedicated peripherals for managing the inputs/outputs aimed at various input/output protocols. This is a matter of providing the widest possible coverage, qualitatively and quantitatively, for the range of input/output interfaces which are liable to be used. An example of one such circuit according to the prior art can be found in an article which was presented at the ISSCC conference in February 2007 by B. Khailany et al. under the number 15.2. The article is entitled "A Programmable 512GOPS Stream Processor for Signal, Image and Video Processing". This circuit has numerous peripherals for managing permanently wired inputs/outputs. Thus, the circuit will be permanently unsuited to an application which uses a new interface, for which no dedicated peripheral has been wired during manufacture. Moreover, an application may require the use of a given type of interface more times than there are dedicated peripherals for this type of interface. The circuit is thus permanently unsuited to such an application. Furthermore, it should not be forgotten that, in practice, most peripherals for managing inputs/outputs on such a circuit remain unused. This is because a given application uses only a limited number of interfaces among all the types of interface which are known at the time of manufacture of the circuit. Therefore, the circuit is often very bulky for no reason, since the majority of its surface holds unused peripherals.

To attempt to make up for these drawbacks, current processors use standard registers called "GPIOs", according to the acronym for "General Purpose Inputs/Outputs". The direction of use, whether at the input, at the output or at high impedance, is controlled by a register which can be loaded by the processor. The value of the outputs is programmed by another register, which is likewise loaded by the processor. The value of the inputs can be read by the processor. Thus, the inputs/outputs by a GPIO register are managed by the processor itself. This solution can therefore be applied only to interfaces which are sufficiently slow for the processor to be able to control them while retaining sufficient time for its application software tasks.

Another current solution is disclosed in the American patent U.S. Pat. No. 6,931,466. A low-level part of the protocol is managed by a processing processor, since some pins can be programmed as GPIOs and therefore controlled directly by the processing processor. An intermediate part of the protocol is managed by a dedicated DMA ("Direct Memory Access") machine, the DMA machine being situated outside of the input/output peripherals. The low part of the protocol is managed by a state machine of "Pin State Machine" type, which is itself made up of a state register and a PLA ("Programmable Logic Array"). A major drawback of this solution is that a PLA is programmed by masking. Thus, even if it is possible to change the protocol by changing only a single manufacturing mask and not the whole set, it should be noted that once the circuit has been produced it is no longer possible to change the program! This solution therefore lacks flexibility and allows only fairly simple protocols to be addressed. In any case, it does not allow the processing processors to be freed completely.

SUMMARY OF THE INVENTION

A notable aim of an embodiment of the present invention is to provide programmable input/output peripherals which allow the circuit which receives them to be adapted to all the new input/output protocols. Thus, the circuit's processor or processors are permanently relieved of managing the inputs/outputs and can devote themselves fully to their application software tasks. In return, the inputs/outputs are seen as memories by the program of the processor or processors. The processors write their output data to a memory area corresponding to the desired peripheral and signal the availability of a certain quantity of data to the peripheral by means of a message. The peripheral according to the invention transmits the data from this memory area to the circuit's pins, according to the protocol for which it has been specifically programmed. Conversely, the peripheral according to the invention samples the data received on the pins according to the protocol for which the peripheral has been programmed. It arranges them in its memory area and signals to the processors the arrival of a certain quantity of data by means of a message or an interrupt. The processor first starts to read these data from the corresponding memory area when it wishes. To that end, the invention relates to a circuit having at least one processor and a microprogrammed machine for processing data which enter or leave the processor in order to input or output them into/from the circuit via pins in compliance with a communication protocol. Each pin allows the input or output of one bit of information. The microprogrammed machine determines, in each of its clock cycles and in a single instruction, which pins are in input mode and which pins are in output mode, which value to assign to each pin, which values to transmit to the processor or else which signals to await before continuing to send or receive data.

In one preferred embodiment, an instruction from the microprogrammed machine may have a field allowing determination of which pins are in input mode and which pins are in output mode, at least one field allowing determination of which value to assign to each pin in output mode, a field allowing determination of which values to transmit to the processor or else a field allowing determination of which signals to await before continuing to send or receive data. Thus, the input/output mode of each pin, the value to be assigned to each pin, the values to be transmitted to the processor and the signals to await can be determined in one clock cycle.

In one preferred embodiment, the microprogrammed machine may have an instruction register and a microprogram memory containing instructions which form a microprogram, wherein the register can be loaded with instructions from the microprogram and wherein the instructions allow processing of the data which enter or leave the processor in order to input or output them into/from the circuit in compliance with the communication protocol. Advantageously, the instructions can be modified in the microprogram memory such that the circuit can be adapted to any communication protocol.

By way of example, each instruction may have at least one field allowing deduction of the address of the next instruction to be executed in the microprogram memory.

In one embodiment, the circuit may have a network interface module between the microprogrammed machine and a communication network used by the processor. The processor and the microprogrammed machine can interchange the data by writing then reading them to/from a memory, wherein the memory contains the data only temporarily.

By way of example, a given set of adjacent pins may thus form an input/output port which can be used by the microprogrammed machine in order to input into the circuit the data on their way to the processor or in order to output from the circuit the data coming from the processor, in compliance with the communication protocol.

In one embodiment, each pin can be connected to an amplifier allowing a signal to be sent or received on the pin. The circuit may thus have a pin interface module between the memory and the amplifiers, wherein the instructions forming the microprogram control the transfer of the data between the memory and the amplifiers through the pin interface module.

In one preferred embodiment, the circuit may have a module allowing conversion of words in the format of the memory into words in a format suited to the number of pins available for inputting or outputting the data into/from the circuit in compliance with the communication protocol, the latter format being advantageously determined by the instructions forming the microprogram. 32-bit parallel data can be converted into 16-, 8-, 4- or 2-bit parallel data, and vice versa. 32-bit parallel data can be converted into serial data, and vice versa.

Advantageously, the circuit may have at least two microprogrammed machines for processing data which enter or leave the processor in order to input or output them into/from the circuit in compliance with communication protocols. Since two adjacent sets of pins can respectively be used by two machines, the circuit may have a shift module allowing a first machine to use, in addition to its own set of pins, pins in the adjacent set of the second machine, wherein the instructions forming the microprogram allow control of the shift module. The circuit may also have a shift module allowing the second machine to use, in turn, pins in an adjacent set of pins from a third microprogrammed machine. Since two spaces in the memory can respectively be used by two machines using adjacent ports, wherein the two spaces are divided into a plurality of memory buffers, a first machine can use, in addition to its own memory buffers and in proportion to the volume of data which it processes, memory buffers from the second machine. The second machine can likewise use, in turn, in proportion to the volume of data which it processes, memory buffers from a third microprogrammed machine using a port adjacent to its own.

Since the microprogrammed machine has a clock for clocking its processing cycles, the clock can provide an operating frequency from an external peripheral. The clock can likewise provide an operating frequency obtained by multiplying or dividing the operating frequency of the processor. The instructions forming the microprogram can allow selection of an operating frequency provided by an external peripheral or an operating frequency obtained by multiplying or dividing the operating frequency of the processor by an adjustable coefficient.

The circuit may have a module for recognizing the control data of the communication protocol, wherein the control data to be recognized are provided by the microprogrammed machine.

The microprogrammed machine may have a loop counting module.

The invention again has the main advantages that it allows optimization of the use of the memory and pin resources of the circuit. This is because the peripherals according to the invention can share the memory and pin resources among one another. If several input/output peripherals are necessary in order to communicate with several other circuits simultaneously, it is possible that the needs in terms of memory space and in terms of the number of pins are different. It is thus beneficial to be able to distribute these resources among the peripherals on the best terms, so as to limit the total number of pins on the circuit and the size of the memory.

BRIEF DESCRIPTION OF DRAWINGS

Other features and advantages of the invention will emerge with the aid of the description which follows and which refers to appended drawings, in which.

DETAILED DESCRIPTION

Figure 1:
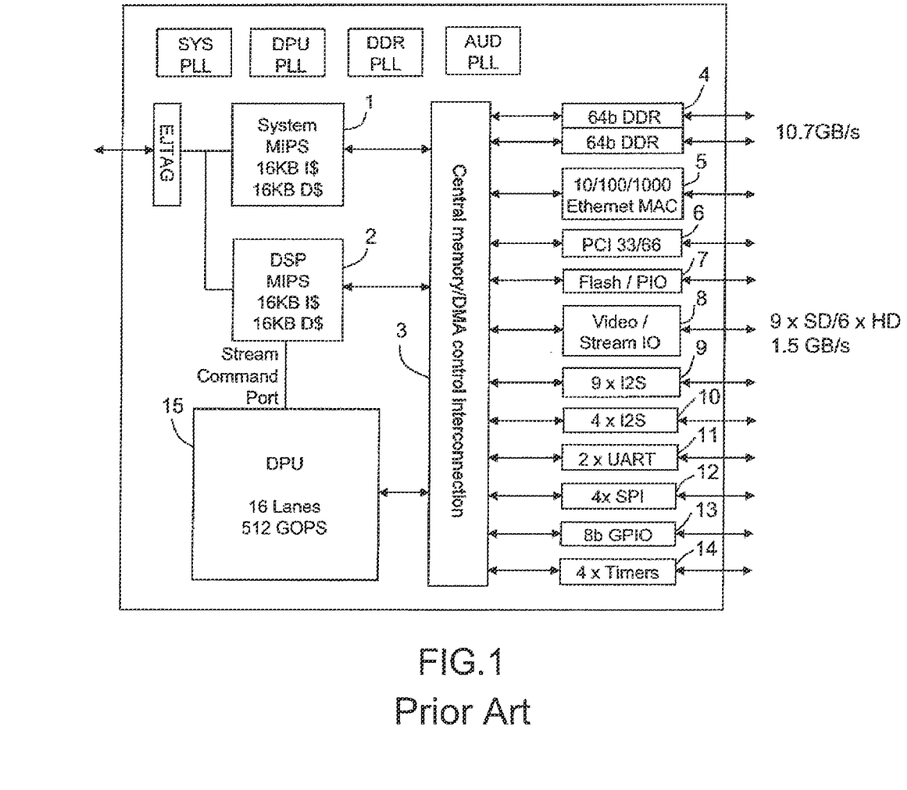
FIG. 1 shows an overview diagram illustrating a multiprocessor circuit according to the prior art.

FIG. 1 uses an overview diagram to illustrate a multiprocessor circuit according to the prior art. This is the circuit described by paper 15.2 from the ISSCC2007 conference cited previously. The circuit in FIG. 1 notably has three processors 1, 2 and 15, and a data bus 3. It likewise has eleven wired peripherals for managing the inputs/outputs, namely the peripherals 4, 5, 6, 7, 8, 9, 10, 11, 12, 13 and 14. Peripheral 4 is capable of managing two "DDR SDRAM" interfaces simultaneously. Peripheral 5 is cable of managing an "Ethernet" interface. Peripheral 6 is capable of managing a "PCI" interface. Peripheral 7 is capable of managing a "Flash/PIO" interface. Peripheral 8 is capable of managing a "Video" interface. Peripheral 9 is capable of managing three "I2S" interfaces simultaneously. Peripheral 10 is capable of managing four "I2C" interfaces simultaneously. Peripheral 11 is capable of managing two "UART" interfaces simultaneously. Peripheral 12 is capable of managing four "SPI" interfaces simultaneously. Peripheral 13 is capable of managing a "GPIO" interface. Peripheral 14 is capable of managing four "Timer" interfaces simultaneously. The circuit in FIG. 1 is a good illustration of the drawbacks of the circuits according to the prior art which implement a large number of dedicated peripherals for managing the inputs/outputs, with the aim of providing the widest possible coverage for the range of interfaces which are liable to be used. This is because, since peripherals 4 to 14 are permanently wired, the circuit in FIG. 1 will be permanently unsuited to an application using a new interface for which no peripheral has been wired. By way of example, the circuit in FIG. 1 is unsuited to an application using a USB interface. The circuit in FIG. 1 is likewise unsuited to an application requiring the simultaneous use of three "DDR SDRAM" interfaces. Finally, the circuit in FIG. 1 is bulky on account of the eleven peripherals 4 to 14, whereas most of these peripherals remain unused in the majority of the applications of the circuit. This is because it is highly unlikely that an application will use 24 input/output interfaces simultaneously!

Figure 2:
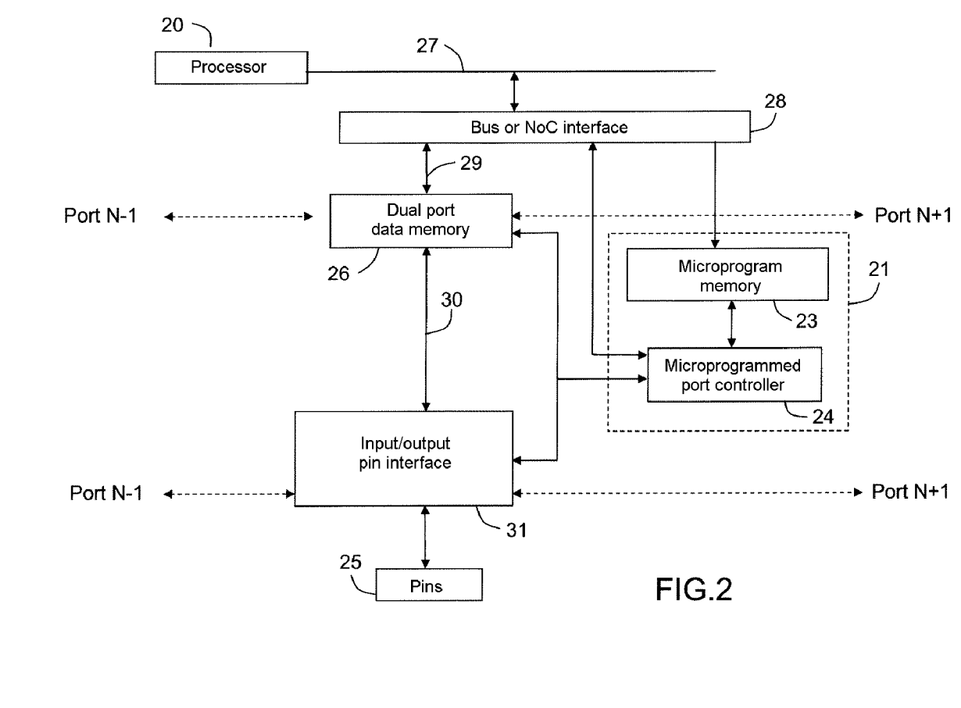
FIG. 2 shows an overview diagram illustrating a simplified architecture example for a circuit.

FIG. 2 uses an overview diagram to illustrate a simplified architecture example for a circuit according to the invention. In this example, a single processor 20 uses a single interface for its data inputs/outputs. A microprogrammed machine 21 according to the invention allows this input/output interface to be managed. The microprogrammed machine 21 may have, by way of example, a microprogram memory 23 and a microprogrammed port controller 24. It is the microprogram contained in the memory 23 which implements the management of the communication protocol corresponding to the input/output interface. Thus, it appears that the only limitation of the present invention is quantitative: this stems from the number of microprogrammable machines used. This is because a circuit implementing the present invention will not be able to make simultaneous use of more input/output interfaces than it has microprogrammed machines such as the machine 21. In practice, the limitation stems from the space available on the circuit for inserting the microprogrammable machines such as machine 21, but it may also stem from the space available for inserting pins 25. The pins 25 allow the physical sending and receiving of the signals carrying the data. Each pin allows the transportation of one bit of information at a time. By contrast, the present invention does not have any qualitative limitation: any type of interface, even new and/or unknown at the time of the manufacture of the card, can be implemented by microprogramming the machine 21.

Advantageously, the invention proposes by way of example the use of a memory 26 to provide the interchanges between the processor 20 and the machine 21. At the output, the processor 20 can temporarily write its data to the memory 26 by means of a data bus or a data distribution network ("Network on Chip" or NoC) 27 and an interface 28 with this bus or this NoC, for example. The machine 21 transfers the data from the memory 26 to the circuit's output pins 25. At the input, the machine 21 temporarily transfers the data received on the circuit's input pins 25 to the memory 26, and the processor 20 reads the data from the memory 26 by means of the data bus 27 and the interface 28. Thus, from a purely logical point of view, the processor 20 sees the inputs/outputs as memory spaces from and to which it reads and writes in its own format and at its own clock rate. In parallel, the machine 21 transfers the data to and from these very memory spaces. However, only the machine 21 takes on the format conversion tasks for the data. At the input, it picks up the control data, for example, so as to transfer to the memory 26 only useful data and so as not to pollute the processor 20, which would not know how to process the control data. At the output, it adds control data, for example, to the useful data that it has transferred from the memory 26. All of these read and write operations in the memory 26 by the machine 21 are performed at the clock rate of the input/output interface, independently of the operating clock rate of the processor 20.

In the simplified embodiment in FIG. 2, the processor 20 communicates only with the machine 21. However, the invention could also work if the processor 20 communicated simultaneously with other processors or other microprogrammed machines, through the bus or NoC 27, for example. Likewise, the machine 21 could be shared over time between several processors by means of the bus or NoC 27. In terms of function according to FIG. 2, the memory 26 allowing the interchange of data between the processor 20 and the machine 21 is a dual port memory: a port 29 controlled by the processor 20 and a port 30 controlled by the machine 21. Advantageously, the memory 26 may physically be a dual port memory. However, the memory 26 may likewise be a single port memory in which the port is shared over time between the processor 20 and the machine 21. The memory 26 may also be made up of two memories operating in ping-pong mode. In output mode (or in input mode), the processor 20 writes (or reads) to (or from) a first memory while the machine 21 reads (or writes) from (or to) the second memory. Next, the processor 20 writes (or reads) to (or from) the second memory while the machine 21 reads (or writes) from (or to) the first. However, even if the latter possibility limits the surface area occupied by the memory 26, it complicates the interface between the machine 21 and the processor 20. This is because the machine 21 is clocked by a clock whose frequency corresponds to the bit rate of the inputs/outputs corresponding to the input/output interface. This clock rate is independent of that of the processor 20. The interface between the clock domain of the processor 20 and the clock domain of the machine 21 is considerably simplified by virtue of the use of two independent ports to access the memory 26.

As illustrated by FIG. 2, the interface 28 controls the port 29. The data signals from the port 30 can, for their part, be linked to a pin interface module 31, for example. The module 31 allows the data to be output to the pins 25 or conversely the data which are present on the pins 25 to be transferred to the memory 26. The port 30 is controlled by the microprogrammed controller 24 according to the invention, the role of which is to ensure that the data interchanges take place according to the communication protocol corresponding to the input/output interface. It is the microprogram of the controller 24, contained in the microprogram memory 23, which determines the communication protocol implemented by the machine 21. This microprogram can be loaded from the interface 28 when the system is initialized. Furthermore, the microprogrammed controller 24 controls the configuration and operation of the pin interface module 31. If the communication protocol corresponding to the interface is complex, the machine 21 will manage only the low layers of the protocol, such as the transmission of the data in the two directions, the synchronization, and possibly the error correction. The high layers, such as the setup of a session and interpretation of the data, will be taken on by the processor 20.

The circuit illustrated by FIG. 2, with the exception of the processor 20 and the bus 27, for managing, in accordance with the invention, an input/output interface is an input/output peripheral. Subsequently, this outfit will simply be called "input/output peripheral". Moreover, all of the input/output peripherals do not require the same number of pins. Some serial interfaces use only 3 pins, whereas other interface may require around sixty. As illustrated by FIG. 2, rather than designing each port to have the maximum number of pins, the present invention proposes that an input/output port be able to configured to use all or some of the pins of the ports which are physically adjacent to it. Thus, if the input/output peripheral according to the invention illustrated by FIG. 2 uses pins forming a port N, it is also capable of using pins from the port N−1 or from the port N+1, the ports N−1 and N+1 being used by other input/output peripherals according to the invention. This mechanism will be explained in detail below, however.

Figure 3:
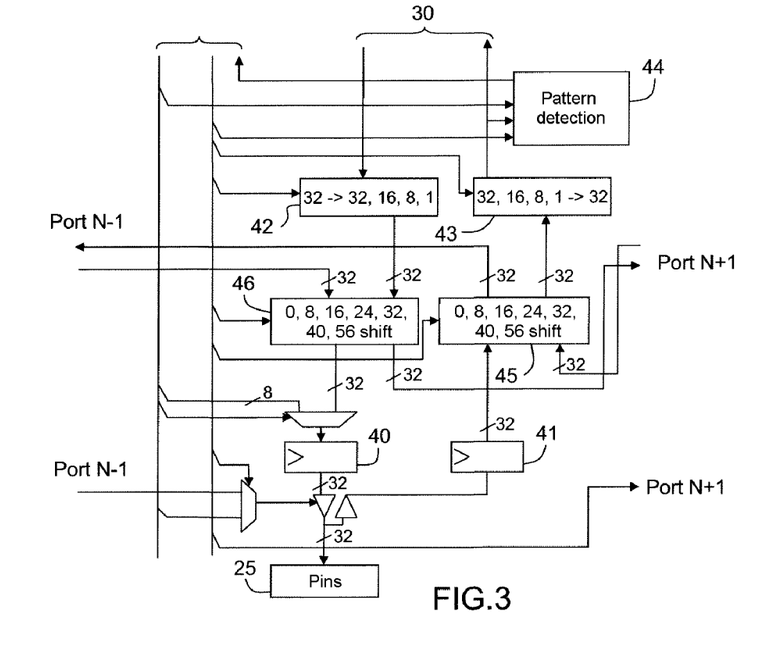
FIG. 3 shows an overview diagram illustrating an implementation example for a pin interface module.

FIG. 3 illustrates an implementation example for the pin interface module 31, which allows the data to be transferred between the memory 26 and the pins 25 by means of the port 30. The pins 25 are controlled by an output register 40 and an input register 41. By way of example, on a clock edge of the input/output peripheral, output data are recorded in the output register 40, which has 32 bits. One portion of the data may come from the data memory 26 and another portion may come from the controller 24. The latter may be programmed byte by byte. When the data come from the controller 24, they are loaded byte by byte. When they come from the memory 26, several formats are possible. According to the communication protocol implemented by the input/output peripheral, the number of bits in the interchanged words may be very variable. Very probably, it is different than the format of the words from the processor 20. However, the most common formats are 1 bit for the serial inputs/outputs and 8 bits, 16 bits, 32 bits or 64 bits for the parallel inputs/outputs. In the present example, the bus 27 uses 32-bit words. The memory 26 therefore stores 32-bit words which can be received or sent directly on the interface 28. Consequently, it is advisable to perform a format conversion between the memory 26 and the register 40. In the present implementation example, the register 40 can be loaded in a single clock cycle if the format of the output data is less than 32 bits. When the output data format is between 32 and 64 bits, registers identical to the register 40 and pins of adjacent peripherals are used. Two clock cycles are thus necessary for transferring the data from the memory 26. Advantageously, a module 42 for converting the format of the output data can be made up of several multiplexers. A first 32-bit to 1-bit multiplexer can be used for the serial outputs. Said multiplexer allows all the bits of a single word from the memory 26 to be successively directed to the same pin. It should be noted that, so as not to complicate the format conversion module 42 too greatly, a single one of the pins controlled by an input/output port can receive such serial data. A second 32-bit to 8-bit multiplexer can be used for the 8-bit parallel outputs. As previously, only the first 8 pins of each port are able to receive the inputs/outputs in bytes. A third 32-bit to 16-bit multiplexer and a fourth 32-bit to 32-bit multiplexer can be used in an entirely similar manner for the 16-bit and 32-bit outputs, respectively. As far as formats with more than 32 bits are concerned, the pins of the adjacent input/output port are used, as will be explained below. Of course, these formats require two clock cycles for each read/write operation in the memory 26. This may likewise be the case for two consecutive words from the memory 26. The intermediate formats between two of the provided formats use the immediately higher format. By way of example, for 10-bit data, the 16-bit format is used with 6 pins remaining unused. The format used is determined by virtue of configuration registers with are loaded in the controller 24, which will be described in detail below.

At the input, the data can be processed in a very similar manner by the input register 41 and a module 43 for converting the format of the input data. According to the state of the configuration registers loaded in the controller 24, the module 43 may allow, by way of example, serial inputs, 2-bit inputs, 4-bit inputs, byte inputs or 16-bit word inputs to be converted into 32-bit words or may even allow 32-bit word inputs to be processed directly. The data converted into 32-bit words are thus stored in the memory 26 organized into 32-bit words. When the chosen format is more than 32 bits, loading takes place in two cycles. Optionally, the module 43 may comprise a programmable error correction unit for the purpose of correcting transmission errors. This is supported by a certain number of communication protocols, such as the USB standard.

Each pin among the pins 25 may have an amplifier or "driver" connected to it, for example. The drivers are bidirectional. As in the GPIOs of some microprocessors and as explained in detail below, the drivers are controlled by control signals through registers by the controller 24. As far as the outputs are concerned, the register 40 contains 1 bit per pin indicating the value 0 or 1 to be output on the pin. Another register, situated in the controller 24, indicates whether or not the output drivers are at high impedance. In order to simplify control of the drivers, it is proposed here that the outputs be controlled by groups of 8 bits. A certain number of 8-bit groups are configured at the input, and the others are configured at the output. Optionally, however, to retain a little flexibility, one of the groups can be configured at the input or at the output independently bit by bit. To implement this functionality, the register indicating the high-impedance outputs is organized in 2 parts. One part contains 1 high-impedance bit per byte. Another part contains 1 high-impedance bit per bit for 8 bits. A configuration register indicates which byte is controlled bit by bit. The data which are present at the inputs are sampled by a third register, the register 41. Alternatively, the bits from the first register can be reused for this purpose by means of appropriate multiplexing.

In some communication standards, it may be necessary to recognize some control data structures or "patterns". These are specific data blocks indicating the start or end of a data block and/or allowing the transmitter and receiver to be synchronized, for example. Advantageously, a pattern detection module 44 may allow comparison of the outputs of the format conversion and one or more patterns supplied by the controller 24, which may furthermore indicate the bits or bytes whose value cannot be taken into account for the comparison. The results of the comparison are thus supplied in return to the controller 24.

Finally, shift modules 45 and 46 may advantageously allow the input/output peripheral according to the invention illustrated by FIG. 2 to be interconnected with neighboring input/output peripherals. As already set out above, this allows port N to be able to be configured to use all or some of the pins of port N+1, which is adjacent to it. This mechanism is illustrated in detail by FIG. 4.

Figure 4:
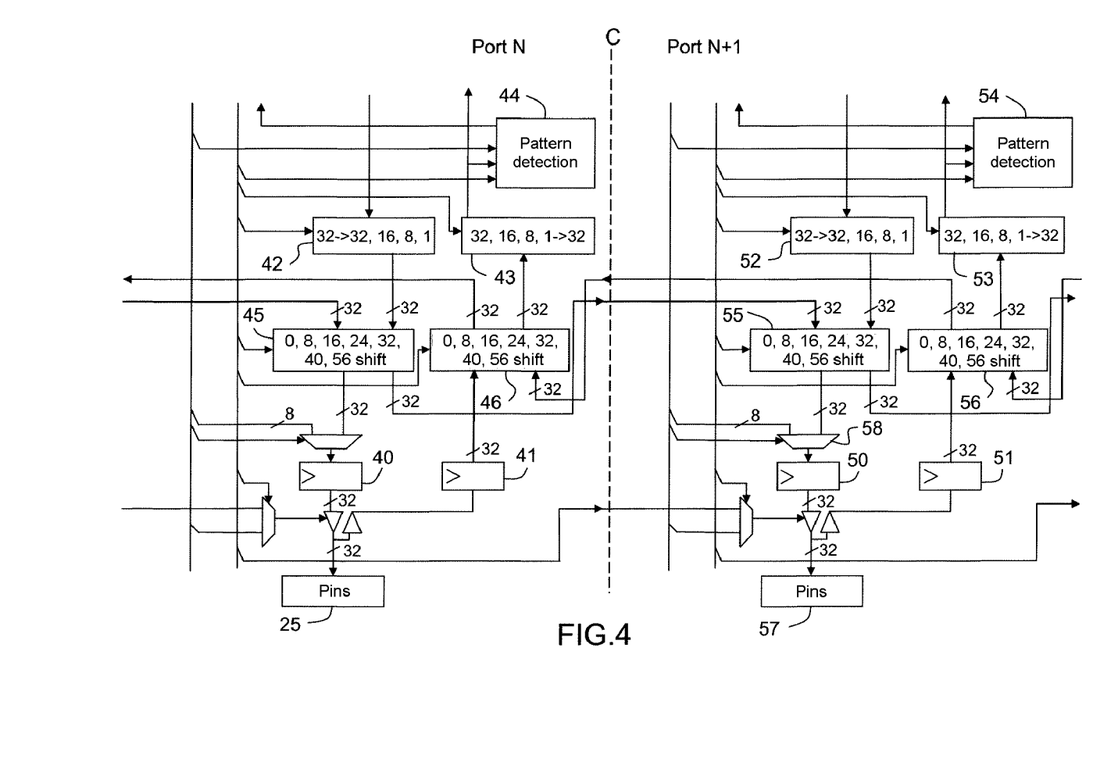
FIG. 4 shows an overview diagram illustrating an interconnection example for two input/output peripherals on the same circuit.

FIG. 4 illustrates an interconnection example for two input/output peripherals according to the invention on one and the same circuit, by virtue of shift modules such as modules 45 and 46. The reason for this is that all the input/output peripherals do not need the same number of pins. Some serial interfaces use only three pins: one for input data, one for output data and one for the clock. Other interfaces may require around sixty pins. Each port could be designed to have the maximum number of pins for the envisaged interfaces. However, this would result in a very large number of pins on the periphery of the circuit, whereas many of them would not be used. A pin takes up a large surface area of silicon. It is therefore advisable to optimize the total number of pins. The solution proposed by the invention is that an input/output port N be able to configured to use all or some of the pins of port N+1 immediately to its right or of port N−1 immediately to its left, in addition to all or some of its own pins.

In the example in FIG. 4, port N may be configured, by way of example, to use pins from port N+1 immediately to its right. A vertical straight line C divides FIG. 4 into two halves. To the left of the straight line C, the same elements are shown as those in FIG. 3, namely the implementation example for the pin interface module 31 controlling port N formed by the pins 25. To the right of the straight line C, another pin interface module is shown, the one from another input/output peripheral whose pins 57 are situated physically to the right of the pins 25 forming port N. The pins 57 form port N+1. In an entirely similar manner, this other pin interface module may have an output register 50 and an input register 51, a module 52 for converting the format of the output data, a module 53 for converting the format of the input data, a pattern detection module 54, and shift modules 55 and 56.

By way of example, the shift module 55 receives a 64-bit bus at its input. This input bus is formed from the concatenation of the 32-bit data bus coming from the format conversion of the module 52 from its own port N+1 for low significances and of the 32-bit data bus coming from port N on the left for high significances. The module 55 supplies an output shifted by a programmable number of bits, for example 0, 8, 16, 24, 32, 40 or 56 bits, on a 64-bit output bus. This output bus is connected to the registers 50 for controlling the pins 57 of its own port N+1 for the 32 most significant bits and is connected to the registers for controlling the pins of port N+2 situated on its right for the 32 least significant bits. Port N+2 is not shown in FIG. 4. It has the same architecture as ports N and N+1. When a data format has more than 32 bits, the data transfer takes place in two goes. When the least significant bits are transferred, the shift module 55 is programmed to shift 32 bits more than when the most significant bits are transferred. The number of shifted bits is programmed by a configuration register loaded in the controller 24. In the present embodiment, in order to simplify the shift module 55, it is proposed that it be limited to shifts of 0, 8, 16, 32, 40, 48 or 56 bits. This is because this limits its complexity to 64 8-to-1 multiplexers instead of 64 64-to-1 multiplexers, or rather to two shift modules 55 and 56 which each comprise 64 8-to-1 multiplexers. The constraints which arise are firstly that the number of inputs and the number of outputs must be multiples of 8, and secondly that the 32-to-1 multiplexer of the format conversion module 52 used for the outputs and the 1-to-32 demultiplexer of the format conversion module 53 used for the inputs are not connected to the same bit of the first byte. By way of example, the first bit can be used for the outputs and the last bit can be used for the inputs. Thus, a serial interface will be able to immobilize only eight pins controlled by the register in which the high-impedance states can be programmed bit by bit: the first bit for the serial output, the last bit for the serial input. The other bits can be used for any validation signals.

Of course, a single circuit may have many more than two interconnected peripherals according to the invention, so as to be able to use a large number of input/output interfaces simultaneously.

Figure 5:
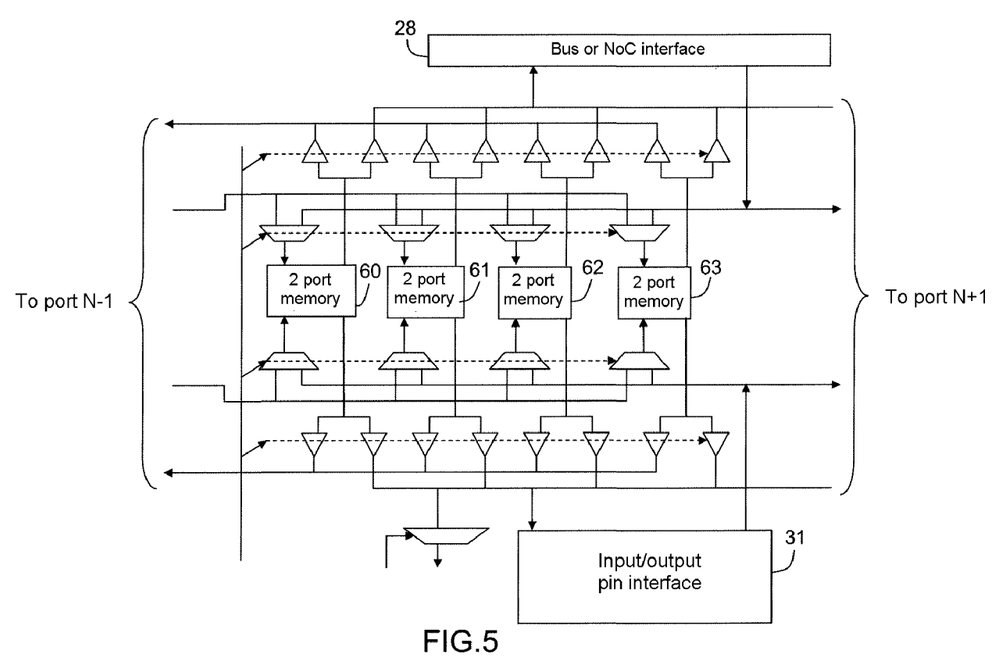
FIGS. 5 and 6 show overview diagrams illustrating implementation examples for a memory.
Figure 6:
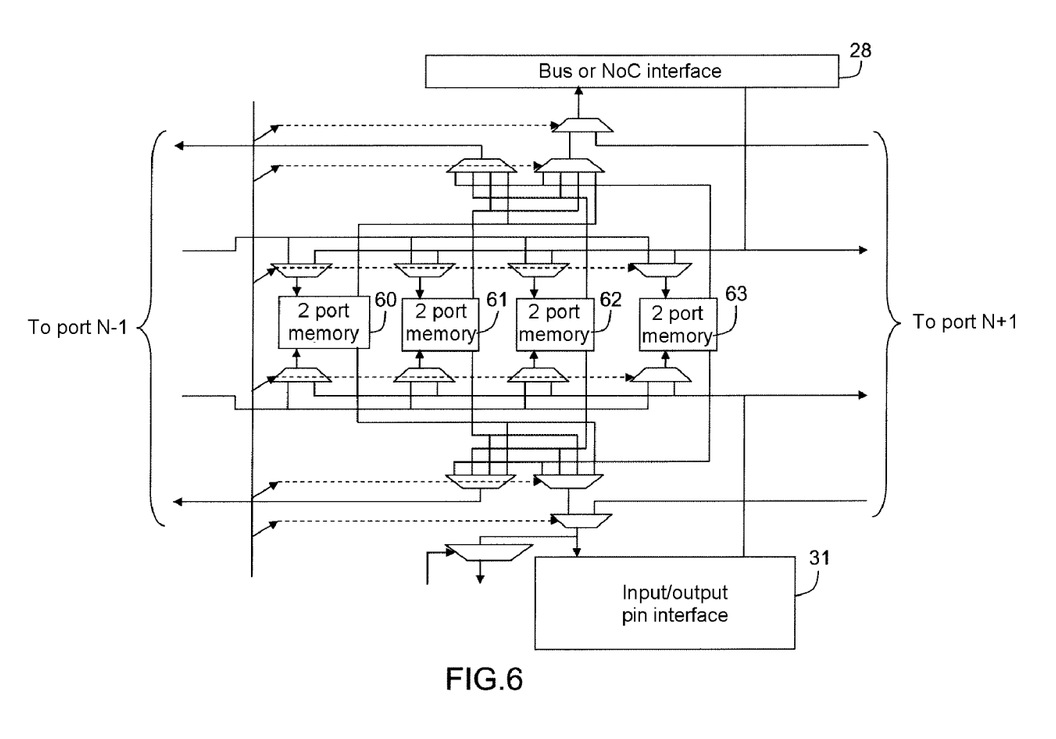

FIGS. 5 and 6 illustrate advantageous implementation examples of the memory 26. The reason for this is that all the input/output ports do not need the same memory quantity. Typically, a serial port has a bit rate which is 32 times lower than a 32-bit port, and it therefore requires a memory space which is 32 times smaller. In a similar manner to the sharing of pins, in order to optimize the use of the resources in memory and therefore the silicon surface area, it may be beneficial to share the memory 26 among the input/output ports. One solution may advantageously be to divide the memory of each port into several buffers, for example by dividing the memory 26 of port N into four buffers 60, 61, 62 and 63. In this way, a variable number of between 1 and 7 buffers can be allocated to port N, the latter being able to use all or some of the buffers from port N+1 immediately to its right. Likewise, port N−1 can use all or some of the buffers from port N immediately to its right. FIG. 5 illustrates an example of the memory 26 being divided into four buffers 60, 61, 62 and 63 using a tri-state bus. FIG. 6 illustrates another example of a memory 26 being divided into four buffers 60, 61, 62, and 63, but this time using multiplexing of the outputs.

Figure 7:
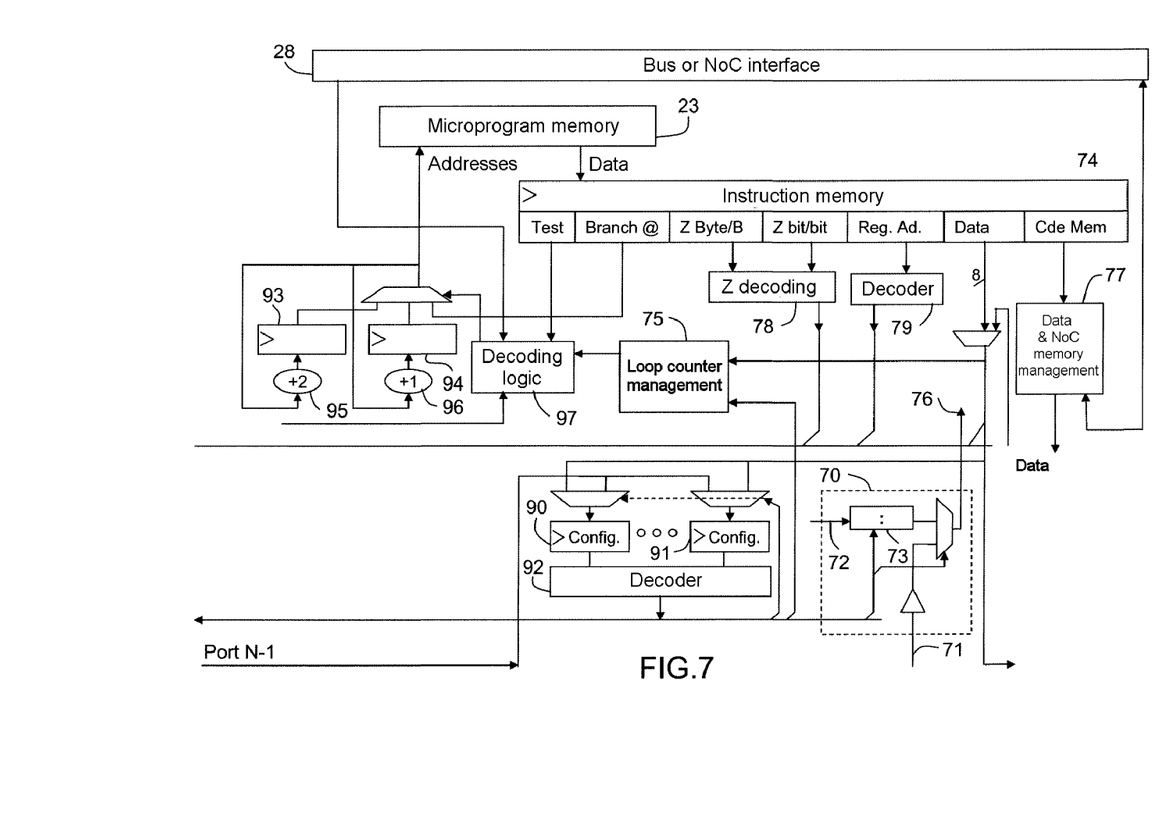
FIG. 7 shows an overview diagram illustrating an implementation example for a controller.

FIG. 7 illustrates an implementation example for the controller 24. This is in a way the heart of the input/output peripheral. In each of its clock cycles, the controller 24 has to determine in a single instruction, among the pins 25, which pins are in input mode and which pins are in output mode. This is done by describing whether or not the drivers are at high impedance. In each of its clock cycles, the controller 24 also has to determine in a single instruction which value needs to be assigned to which pin in output mode among the pins 25. This may be a value from the data memory 26, and thus from the processor 20. It may likewise be a value decided by the controller 24 itself, such as a validation signal for the data, for example. In each of its clock cycles, the controller 24 also has to determine in a single instruction, among the values sampled on the pins 25 in input mode, which ones need to be transmitted to the processor 20 via the memory 26. In each of its clock cycles, the controller 24 finally has to determine in a single instruction which signal(s) to await before continuing to send or receive data via the pins 25.

Advantageously, a single clock 70 can be used by all of the elements of the input/output peripheral, with the exception of the interface 28, which needs to operate at the frequency of the bus 27. According to the program of the controller 24, the clocking provided by the clock 70 may have two possible origins. Its origin may be external, with the clocking being able to come directly from a pin 71. Alternatively, its origin may be internal, with the system clock being able to be received by the clock 70 via an input 72. In the latter case, a frequency divider 73 may allow interfaces which are slower than the system clock to be addressed. There again, the value of the divider 73 can advantageously be programmed by the controller 24. However, in order to address interfaces which are faster than the system clock, the divider 73 can also be replaced by a frequency multiplier, for example using a "phase-locked loop" type mechanism. The clock 70 provides the clocking on an output 76. There again, the mode in which the clock 70 operates, namely with internal or external clocking, can advantageously likewise be selected by the controller 24 by virtue of the programming of a configuration register. When the clock 70 is operating in internal clocking mode, the clocking can likewise be applied to an output pin which is not shown in FIG. 7.

The controller 24 executes instructions from the microprogram memory 23, which it can load into an instruction register 74, for example. An instruction is made up of several separate fields, one of the fields allowing the address of the next instruction to be determined. When the system is initialized, the program is loaded into the microprogram memory 23 via the interface 28. Advantageously, however, it may likewise be envisaged for the program to be reloaded in the course of operation, for example when an external peripheral using a new interface is connected. Thus, the microprogram executed by the machine 21 can be modified dynamically while the circuit is being used. Numerous possibilities exist for precisely defining the structure of an instruction word and the instruction set. The instruction register 74 illustrates an example of the structure of an instruction word. The length of the fields is given for information purposes only. In the embodiment in FIG. 7, a 6-bit "Test" field indicates whether the program needs to continue to the next address or to jump to the address following the next address or to jump to the address indicated in a "Branch @" field, for example, which gives the branch address and which will be described subsequently. The "Test" field likewise indicates the conditions under which the jump needs to take place. By way of example, this may be without any condition or when a loop counter, described below, overflows or when a message from the interface 28 is received or else when a pattern is detected by the module 44. The 8-bit "Branch @" field thus indicates a branch address, with its 8 bits thus allowing up to 256 instructions to be addressed in the program memory 23. An 8-bit "Z Byte/B" field indicates the high-impedance bytes. An 8-bit "Z bit/bit" field indicates, for the byte whose state is managed bit by bit, the high-impedance bits. A module 78 allows the "Z Byte/B" and "Z bit/bit" fields to be decoded. An 8-bit "Reg. Ad." field indicates the register to be loaded and indicates whether the value to be loaded is from a "Data" field, which will be described below, or from the data memory 26. If the value is from the memory 26, the "Reg. Ad." field also indicates from which byte. This allows fixed or configurable values to be loaded from the processor 20. A module 79 allows the "Reg. Ad." field to be decoded. The 8-bit "Data" field thus indicates the value to be loaded into the register indicated by the "Reg. Ad." field. By way of example, this may be a value for the output pins among the pins 25 or patterns to be detected with the module 44 or else an initial value or modulo for the loop counters. A 2-bit "Cde Mem" field indicates whether there is a need for access to the data memory 26, and if this is the case, whether it is read access or write access. In the present example, each instruction thus makes 48 bits in total.

The controller 24 can manipulate microprogram addresses by virtue of address registers 93 and 94, by virtue of incrementers 95 and 96 operating on the registers 93 and 94, respectively, and by virtue of a decoding module 97.

By way of example, the instruction set allows direct control of the high-impedance state of the drivers and of the state of eight of the output pins among the pins 25 in the case of validation signals or synchronization codes. The instruction set also allows the configuration registers to be loaded for the purpose of sharing the pins 25, for the purpose of sharing the memory buffers 60, 61, 62 and 63 or else for the purpose of adjusting the clock frequency 70. It also allows loading of the patterns which are to be compared by virtue of the module 44, control of the reading or writing of words from/to the data memory 26, sending of synchronization signals to the interface 28 for the purpose of acknowledging the data received, and signaling of the data which are ready for reading. Moreover, a module 77 allows management of the interchanges between the data memory 26 and the interface 28 for the bus or the system NoC. The instruction set again allows management of the various program branch conditions. Most of these operations can be performed simultaneously, by associating operation with a field in an instruction, so as not to delay the transmission of the data. There again, this is a major advantage of the invention, since known solutions for their part require several clock cycles in order to execute input/output operations.

In the embodiment in FIG. 7, the controller 24 has, by way of example, a module 75 allowing management of two loop counters. The controller 24 can initialize the value of these counters and their modulo in the same way that it can load any system register into them. The value of these counters is incremented in each cycle and a signal is provided when they change to 0 or to their maximum value. These signals, and those provided by the pattern detection module 44, allow the address of the next instruction to be decided.

As already set out previously, the controller 24 likewise has configuration registers, including the registers 90 and 91. A module 92 allows the content of the configuration registers to be decoded.

Figure 8:
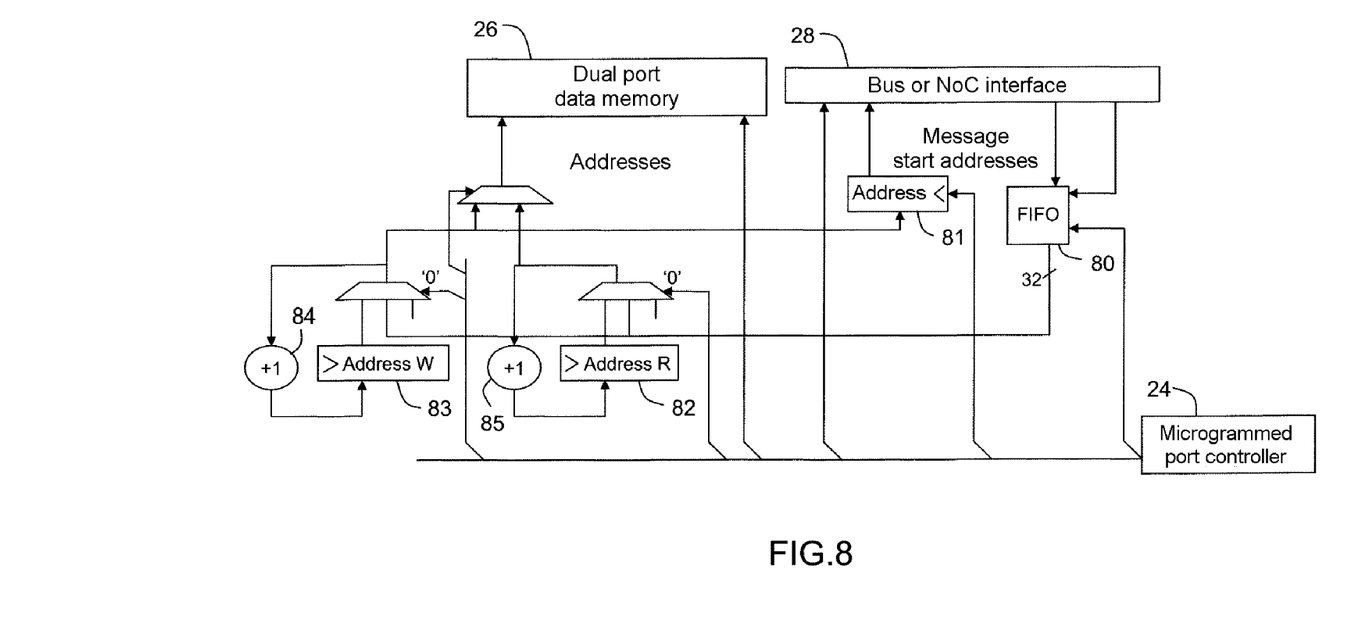
FIG. 8 shows an overview diagram illustrating an architecture example allowing implementation of a memory interface module.

FIG. 8 shows an architecture example allowing implementation of the module 77. The interface 28 provides notification of the arrival of a data block to be transmitted by writing the start address of the data block into an FIFO (First In First Out) structure 80. The interface 28 also sends a signal which can be tested by the controller 24 by means of its instruction set. The controller 24 is able to manage two addresses in the data memory 26, an address "R" in a register 82 for read operations and an address "W" in a register 83 for write operations. When the controller 24 accesses the memory 26, either for the purpose of reading or for the purpose of writing, it can effect this access either at an initial address (for example '0') or at the first available address in the FIFO 80, or at the address following the one used for the last access in the same direction (reading or writing). Incrementers 84 and 85 operate on the registers 82 and 83 with a modulo controlled by a field of the configuration registers loaded in the controller 24. By way of example, when it has finished writing a data block to the memory 26, the controller 24 can send the interface 28 the start address of the message, loaded prior to the data being written to an ad-hoc register 81, and a validation signal.

The invention described above notably provides the advantage of allowing the circuits implementing it to adapt to a very large number of input/output protocols. Moreover, it allows a high level of flexibility to be provided in the choice of site for the pins connecting to the various external peripherals, for example, depending on the routing constraints for the circuit-internal communications between the internal peripheral and the processing processors, or even the routing constraints on the printed circuit between the circuit and its external peripherals. This is because since the internal peripherals according to the invention are all identical, it suffices to program the peripheral managing the pins situated at the desired site for one protocol or another.

The invention claimed is:

1. A circuit comprising at least one processor including a microprogrammed machine for processing data which enter or leave the processor in order to input or output the data into/from the circuit via pins in compliance with a communication protocol, wherein each pin allows the input or output of one bit of information, and the microprogrammed machine determines, in each of its clock cycles and in a single instruction:
   which pins are in input mode and which pins are in output mode;
   which value to assign to each pin;
   which values to transmit to the processor; and
   which signals to await before continuing to send or receive data.

2. The circuit as claimed in claim 1, wherein an instruction from the microprogrammed machine comprises:
   a field allowing determination of which pins are in input mode and which pins are in output mode;
   at least one field allowing determination of which value to assign to each pin in output mode;
   a field allowing determination of which values to transmit to the processor; and
   a field allowing determination of which signals to await before continuing to send or receive data;
such that the input/output mode of each pin, the value to be assigned to each pin, the values to be transmitted to the processor and the signals to await are determined in one clock cycle.

3. The circuit as claimed in claim 1, wherein the microprogrammed machine comprises an instruction register and a microprogram memory containing instructions which form a microprogram, wherein the register is loaded with instructions from the microprogram, wherein the instructions allow processing of the data which enter or leave the processor in order to input or output the data into/from the circuit in compliance with the communication protocol, and wherein the instructions are modifiable in the microprogram memory such that the circuit is adaptable to any communication protocol.

4. The circuit as claimed in claim 3, wherein each instruction comprises at least one field allowing deduction of the address of the next instruction to be executed in the microprogram memory.

5. The circuit as claimed in claim 3, wherein each pin is connected to an amplifier allowing a signal to be sent or received on the pin, wherein the circuit comprises a pin interface module between the memory and the amplifiers, and wherein the instructions forming the microprogram control the transfer of the data between the memory and the amplifiers through the pin interface module.

6. The circuit as claimed in claim 3, wherein the format suited to the number of pins available for inputting or outputting the data into/from the circuit is determined by the instructions forming the microprogram.

7. The circuit as claimed in claim 3, wherein the instructions forming the microprogram allow selection of:
   an operating frequency provided by an external peripheral; or
   an operating frequency obtained by multiplying or dividing the operating frequency of the processor by an adjustable coefficient.

8. The circuit as claimed in claim 1, wherein it comprises a network interface module between the microprogrammed machine and a communication network used by the processor.

9. The circuit as claimed in claim 1, wherein the processor and the microprogrammed machine interchange the data by writing then reading them to/from a memory, wherein the memory contains the data only temporarily.

10. The circuit as claimed in claim 9, wherein the circuit comprises a module allowing conversion of words in the format of the memory into words in a format suited to the number of pins available for inputting or outputting the data into/from the circuit in compliance with the communication protocol.

11. The circuit as claimed in claim 9, wherein in the case of two spaces in the memory are respectively usable by two machines using adjacent ports, wherein the two spaces are divided into a plurality of memory buffers, a first machine uses, in addition to its own memory buffers and in proportion to the volume of data which it processes, memory buffers from the second machine.

12. The circuit as claimed in claim 11, wherein the second machine uses, in turn, in proportion to the volume of data which it processes, memory buffers from a third microprogrammed machine using a port adjacent to its own.

13. The circuit as claimed in claim 10, wherein 32-bit parallel data are converted into 16-,18-, 4- or 2-bit parallel data, and vice versa.

14. The circuit as claimed in claim 10, wherein 32-bit parallel data are converted into serial data, and vice versa.

15. The circuit as claimed in claim 1, wherein a given set of adjacent pins forms an input/output port which is usable by the microprogrammed machine in order to input into the circuit the data on their way to the processor or in order to output from the circuit the data coming from the processor, in compliance with the communication protocol.

16. The circuit as claimed in claim 15, wherein in the case of two adjacent sets of pins are respectively usable by two machines, the circuit comprises a shift module allowing a first machine to use, in addition to its own set of pins, pins in the adjacent set from the second machine.

17. The circuit as claimed in claim 16, wherein the microprogrammed machine comprises an instruction register and a microprogram memory containing instructions which form a microprogram, wherein the register is loaded with instructions from the microprogram, wherein the instructions allow processing of the data which enter or leave the processor in order to input or output the data into/from the circuit in compliance with the communication protocol, and wherein the instructions are modifiable in the microprogram memory such that the circuit is adaptable to any communication protocol, and wherein instructions forming the microprogram allow control of the shift module.

18. The circuit as claimed in claim 16, wherein the circuit comprises a shift module allowing the second machine to use, in turn, pins in an adjacent set of pins from a third microprogrammed machine.

19. The circuit as claimed in claim 1, wherein the circuit comprises at least two microprogrammed machines for processing data which enter or leave the processor in order to input or output them into/from the circuit in compliance with communication protocols.

20. The circuit as claimed in claim 1, wherein the microprogrammed machine comprises a clock for clocking its processing cycles, wherein the clock provides an operating frequency from an external peripheral.

21. The circuit as claimed in claim 1, wherein the microprogrammed machine comprises a clock for clocking its processing cycles, wherein the clock provides an operating frequency obtained by multiplying or dividing the operating frequency of the processor.

22. The circuit as claimed in claim 1, wherein the circuit comprises a module for recognizing the control data of the communication protocol, wherein the control data to be recognized are provided by the microprogrammed machine.

23. The circuit as claimed in claim 1, wherein the microprogrammed machine comprises a loop counting module.

* * * * *